(12) United States Patent
Barth (10) Patent No.: US 10,620,752 B2
(45) Date of Patent: Apr. 14, 2020

(54) SYSTEM AND METHOD FOR PREDICTING A TOUCH POSITION OF A POINTER ON A TOUCH-ENABLED UNIT OR DETERMINING A POINTING DIRECTION IN 3D SPACE

(71) Applicant: Delphi Technologies, LLC, Troy, MI (US)

(72) Inventor: Alexander Barth, Wuppertal (DE)

(73) Assignee: DELPHI TECHNOLOGIES, LLC, Troy, MI (US)

( * ) Notice: Subject to any disclaimer, the term of this patent is extended or adjusted under 35 U.S.C. 154(b) by 0 days.

(21) Appl. No.: 16/003,257

(22) Filed: Jun. 8, 2018

(65) Prior Publication Data

US 2019/0004667 A1 Jan. 3, 2019

(30) Foreign Application Priority Data

Jul. 3, 2017 (EP) ..................................... 17179384

(51) Int. Cl.
*G06F 3/042* (2006.01)
*G06F 3/041* (2006.01)
*G06K 9/00* (2006.01)

(52) U.S. Cl.
CPC .......... *G06F 3/0425* (2013.01); *G06F 3/0416* (2013.01); *G06F 3/0418* (2013.01); *G06K 9/00201* (2013.01); *G06K 9/00355* (2013.01); *G06F 2203/04108* (2013.01)

(58) Field of Classification Search
None
See application file for complete search history.

(56) References Cited

U.S. PATENT DOCUMENTS

| 9,400,575 B1 | 7/2016 | Karakotsios et al. |
| 2002/0105482 A1* | 8/2002 | Lemelson ............... G06F 3/013 345/7 |
| 2011/0083089 A1 | 4/2011 | Pahud et al. |
| 2016/0179205 A1* | 6/2016 | Katz ........................ G06F 3/013 345/156 |
| 2017/0192617 A1 | 7/2017 | Barth et al. |

\* cited by examiner

*Primary Examiner* — Nicholas J Lee
(74) *Attorney, Agent, or Firm* — Joseph V. Bonadies (57) ABSTRACT

A system for predicting a touch position of a pointer on a touch-enabled unit includes a 3D imaging unit, a processing unit coupled to the 3D imaging unit, and a touch-enabled unit coupled to the processing unit. The 3D imaging unit is configured to monitor an interaction zone in front of the touch-enabled unit. The processing unit includes a prediction module that is configured to predict where a pointer that approaches the touch-enabled unit and is monitored by the 3D imaging unit will touch the touch-enabled unit, and a calibration module that is configured to generate at least one calibration parameter by comparing the predicted touch position to the actual touch position of the pointer detected by the touch-enabled unit and to transfer the at least one calibration parameter to the prediction module in order to calibrate the prediction module.

20 Claims, 4 Drawing Sheets

SYSTEM AND METHOD FOR PREDICTING A TOUCH POSITION OF A POINTER ON A TOUCH-ENABLED UNIT OR DETERMINING A POINTING DIRECTION IN 3D SPACE

TECHNICAL FIELD OF INVENTION

The present application relates to a system and a method for predicting a touch position of a pointer on a touch-enabled unit. Further, the present application relates to a system and a method for determining a pointing direction of a pointer in 3D space.

SUMMARY OF THE INVENTION

Automotive grade 3D (three dimensional) imaging units, e.g., time-of-flight camera sensors, monitoring the interior of a vehicle, e.g., for hand gesture control systems, are already available on the market. A 3D imaging unit provides distance information by a depth map and amplitude measurements for an array of pixels. With such sensor data it is possible to localize a human hand in 3D space, including the hand centroid, the position and orientation of the fingers, as well as the 3D trajectory of such positions, for example the history of previous positions. In addition, one can derive a 3D velocity vector for characteristic points on the hand.

This information can be used, for example, to compute the position of a hand relative to other objects or components of the vehicle interior, for example the head unit screen, and to predict the hand position ahead of time based on a given motion model, e.g. constant velocity linear motion. It can also be used to virtually extend, for example, the index finger and intersect the corresponding line with a touch screen plane or other elements in the vehicle.

To be able to predict where exactly a user will hit the touch screen or to which object the user points, an accurate absolute calibration between, for example, sensor coordinates and screen coordinates is essential.

It is an object of the invention to provide a system and a method for predicting a touch position of a pointer on a touch-enabled unit as well as a system and a method for determining a pointing direction of a pointer in 3D space, wherein the aforementioned systems and methods can be calibrated in order to minimize errors when predicting the touch position or determining the pointing direction.

The aforementioned object is solved by the features of the independent claims.

According to a first aspect, a system for predicting a touch position of a pointer on a touch-enabled unit comprises a 3D imaging unit, a processing unit coupled to the 3D imaging unit and a touch-enabled unit coupled to the processing unit. The 3D imaging unit is configured to monitor an interaction zone in front of the touch-enabled unit. The processing unit comprises a prediction module and a calibration module. The prediction module is configured to predict where a pointer that approaches the touch-enabled unit and is monitored by the 3D imaging unit will touch the touch-enabled unit. The calibration module is configured to generate at least one calibration parameter by comparing the predicted touch position to the actual touch position of the pointer, wherein the actual touch position of the pointer is detected by the touch-enabled unit. Further, the calibration module transfers the at least one calibration parameter to the prediction module. The at least one calibration parameter is used to calibrate the prediction module.

The calibration module may be configured to calibrate the prediction module by means of the at least one calibration parameter such that a deviation or an error between the predicted touch position and the actual or true touch position is minimized.

It is noted that the calibration module may not only use a single event of the pointer approaching the touch-enabled unit for generating the at least one calibration parameter. The calibration module may also compare a plurality of predicted touch positions to the corresponding actual touch positions in order to generate the at least one calibration parameter.

The pointer may be, for example, a hand or a finger or an index finger of the user or a stylus or a writing utensil or something similar.

The 3D imaging unit may be, for example, a time-of-flight camera. A time-of-flight camera resolves distance based on the known speed of light, measuring the time-of-flight of a light signal between the camera and the subject for each point of the image. A time-of-flight camera may, for example, include an infrared light emitting diode sending out infrared light, in particular a pulsed infrared light signal, and a camera sensor receiving the infrared light after the infrared light has been reflected by a subject. The time-of-flight camera has the advantage of suppressing the ambient light, e.g. sunlight. Thus, only the infrared light from the active infrared illumination is captured.

Alternative 3D imaging units include, for example, stereo vision cameras or structured light cameras or RGB (red green blue) cameras or monochromic cameras or radar systems. The 3D imaging unit can further be enhanced by a color sensitive image sensor.

The touch-enabled unit may include a touch screen or a touch pad or a push button or a touch-sensitive sensor, for example a touch-sensitive sensor integrated into a dashboard of a vehicle.

The system can be installed in a vehicle.

Documents EP 3 182 250 A1 and US 2011/0 083 089 A1, which are incorporated herein by reference, disclose methods to predict where a pointer that approaches a touch-enabled unit and is monitored by a 3D imaging unit will touch the touch-enabled unit.

According to an embodiment, the prediction module is configured to provide coordinates of the predicted touch position in a coordinate system attached to the 3D imaging unit and the touch-enabled unit is configured to provide coordinates of the actual touch position in a coordinate system attached to the touch-enabled unit. The at least one calibration parameter comprises translating and/or rotating and/or scaling parameters for at least one of the coordinate systems attached to the 3D imaging unit and attached to the touch-enabled unit such that a deviation between the coordinates of the predicted touch position in the coordinate system attached to the 3D imaging unit and the coordinates of the actual touch position in the coordinate system attached to the touch-enabled unit is minimized.

The 3D image unit may capture a 3D image of a scene, wherein the 3D image comprises a 2D intensity image of the scene and a depth map of the scene. The 2D intensity image is a 2D grid of pixels and each pixel has a value that indicates the intensity (or signal strength or amplitude) of the light signal received by the respective pixel. The depth map is an image of the same size as the 2D intensity image, where each pixel stores information relating to the distance of the surfaces of subjects in the scene from the 3D imaging unit. The at least one calibration parameter generated by the calibration module may comprise an offset, in particular a constant offset, for the values of the depth map.

The calibration module may be configured to use a plurality of pairs for the generation of the at least one calibration parameter, wherein each of the pairs contains a predicted touch position and a corresponding actual touch position. The pairs can, for example, be recorded by the 3D imaging unit during a single approach of the pointer to the touch-enabled unit or during a plurality of approaches of the pointer to the touch-enabled unit.

The calibration module may be configured to use only those pairs of the plurality of pairs for the generation of the at least one calibration parameter that contain a predicted touch position that was predicted when the distance of the pointer from the touch-enabled unit was in a predetermined distance range.

The calibration module may be configured to use only those pairs of the plurality of pairs for the generation of the at least one calibration parameter that contain a predicted touch position that was predicted during a predetermined time interval before the pointer touched the touch-enabled unit.

Further, the calibration module may be configured to weight each pair with a respective uncertainty factor before using the pairs for the generation of the at least one calibration parameter. The uncertainty factor may depend on the distance of the pointer from the touch-enabled unit when the prediction module predicted the touch position of the respective pair, for example, the greater the distance of the pointer from the touch-enabled unit, the greater the uncertainty.

The calibration module may run a certain calibration procedure for generating the at least one calibration parameter. The calibration module may be configured to request a user to touch at least one predetermined position on the touch-enabled unit with the pointer. The prediction module can then predict where the pointer that approaches the touch-enabled unit in order to touch the at least one predetermined position will actually touch the touch-enabled unit and the calibration module can generate the at least one calibration parameter by comparing the predicted touch position to the at least one predetermined position. This procedure may be expanded, for example, by requesting the user to touch several predetermined positions on the touch-enabled unit with the pointer in a predetermined order.

The system may further comprise a user identification module that is configured to identify a user using the system. For example, the user may be identified by a certain log-in procedure or the user identification module may automatically identify the user. The calibration module may generate the at least one calibration parameter for a respective user and may store the at least one calibration parameter in a memory. When the user identification module identifies the respective user using the system at a later point in time, the at least one calibration parameter can be transferred to the prediction module from the memory in order to calibrate the prediction module for the use of the identified user.

According to a second aspect, a method for predicting a touch position of a pointer on a touch-enabled unit comprises the following steps: monitoring an interaction zone in front of the touch-enabled unit by using a 3D imaging unit; predicting by using a prediction method where a pointer that approaches the touch-enabled unit and is monitored by the 3D imaging unit will touch the touch-enabled unit; and generating at least one calibration parameter by comparing the predicted touch position to the actual touch position of the pointer detected by the touch-enabled unit, and using the at least one calibration parameter to calibrate the prediction method.

The method according to the second aspect may include the same embodiments as described above in connection with the system according to the first aspect.

According to a third aspect, a system for determining a pointing direction of a pointer in 3D space, comprises a 3D imaging unit and a processing unit coupled to the 3D imaging unit. The processing unit comprises a determination module and a calibration unit. The processing unit is configured to determine or estimate a pointing direction of a pointer of a user that is monitored by the 3D imaging unit when the user has the intention to point to an object. The calibration module is configured to generate at least one calibration parameter by comparing the determined pointing direction to the position of the object and to transfer the at least one calibration parameter to the determination module in order to calibrate the determination module.

The calibration module may be configured to calibrate the determination module by the at least one calibration parameter such that a deviation or an error between the determined pointing direction and the actual or true position of the object is minimized such that after calibration the determined pointing direction intersects the object.

The pointer may be, for example, a hand or a finger or an index finger of the user or a stylus or a writing utensil or something similar.

The 3D imaging unit may be, for example, a time-of-flight camera or a stereo vision camera or a structured light camera or a RGB camera or a monochromic camera or a radar system. The 3D imaging unit can further be enhanced by a color sensitive image sensor.

The system can be installed in a vehicle.

Documents EP 3 182 250 A1 and US 2011/0 083 089 A1, which are incorporated herein by reference, disclose methods to determine or estimate a pointing direction of a pointer that is monitored by a 3D imaging unit.

According to an embodiment, the system further comprises an input unit. The user can input a command in the input unit. The input unit may, for example, comprise a microphone so that the user can speak out the command which is then recorded by the input unit. If the command input by the user in the input unit is related to a specific object, the calibration module assumes that the user has the intention to point with the pointer to this object at the same time. For example, if the user says "Increase the volume for this speaker" and points in the direction of a particular speaker at the same time, the calibration module assumes that the user has the intention to point to a speaker and assigns the pointing direction of the pointer to predefined speaker positions from a vehicle model, for example, via a nearest neighbor method. In another example, the user says "Lower the temperature in this area" and points in the direction of a certain air condition vent in the vehicle. The calibration module then assumes that the user has the intention to point to this air condition vent.

The calibration module may run a certain calibration procedure for generating the at least one calibration parameter. The calibration module may be configured to request a user to point with the pointer to a predetermined object. The determination module determines the pointing direction of the pointer when pointing to the predetermined object, and the calibration module generates the at least one calibration parameter by comparing the determined pointing direction to the position of the predetermined object. This procedure may be expanded, for example, by requesting the user to point to several predetermined objects with the pointer in a predetermined order. For example, the calibration procedure may include that the user is requested to point to, e.g., a touch screen, an air condition vent, a speaker, a head-up display and other objects that are located inside and/or outside the passenger compartment in a predetermined order. The determination module can determine the pointing direction of the pointer when pointing to the predetermined objects in the predetermined order, and the calibration module generates the at least one calibration parameter.

The determination module may be configured to determine the pointing direction of the pointer for a plurality of times when the pointer points to the same object and to identify a peak in the distribution of the determined pointing directions. The calibration module may be configured to generate the at least one calibration parameter by comparing the pointing direction corresponding to the peak in the distribution of the determined pointing directions to the position of the object.

In a further embodiment, the 3D imaging unit is configured to capture consecutive images of a scene, wherein at least a first one of the images comprises a 2D intensity image and a depth map, and at least a second one of the images comprises only a 2D intensity image, but not a depth map. In the scene captured by the 3D imaging unit a display is contained that displays one or more elements. The at least one first image and/or the at least one second image are used to calibrate a coordinate system attached to the 3D imaging unit. The determination module uses the at least one second image to determine the coordinates of an element displayed on the display in a coordinate system attached to the 3D imaging unit. The calibration module compares the coordinates of the element in the coordinate system attached to the 3D imaging unit to predetermined coordinates of the element in a fixed coordinate system, for example, a coordinate system attached to a vehicle. Further, the calibration module generates at least one further calibration parameter for calibrating the coordinate system attached to the 3D imaging unit so that the deviation of the coordinates of the element in both coordinate systems is minimized. The at least one further calibration parameter comprises, in particular, rotational and translational calibration parameters.

Beyond elements shown on the display other landmarks in the vehicle that are not colinear can be used to compute the rotation and translation of the 3D imaging unit. Such landmarks can be, for example, characteristic corner points of buttons on the dashboard, the center stack or other surfaces.

According to a fourth aspect, a method for determining a pointing direction of a pointer in 3D space comprises the following steps: monitoring a pointer of a user by a 3D imaging unit when the user has the intention to point to an object; determining a pointing direction of the pointer by using a determination method; and generating at least one calibration parameter by comparing the determined pointing direction to the position of the object and using the at least one calibration parameter to calibrate the determination method.

The method according to the fourth aspect may include the same embodiments as described above in connection with the system according to the third aspect.

Further features and advantages will appear more clearly on a reading of the following detailed description of the preferred embodiment, which is given by way of non-limiting example only and with reference to the accompanying drawings.

BRIEF DESCRIPTION OF DRAWINGS

Embodiments of the invention are described in detail below with reference to the attached drawing figures of exemplary scale, wherein.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
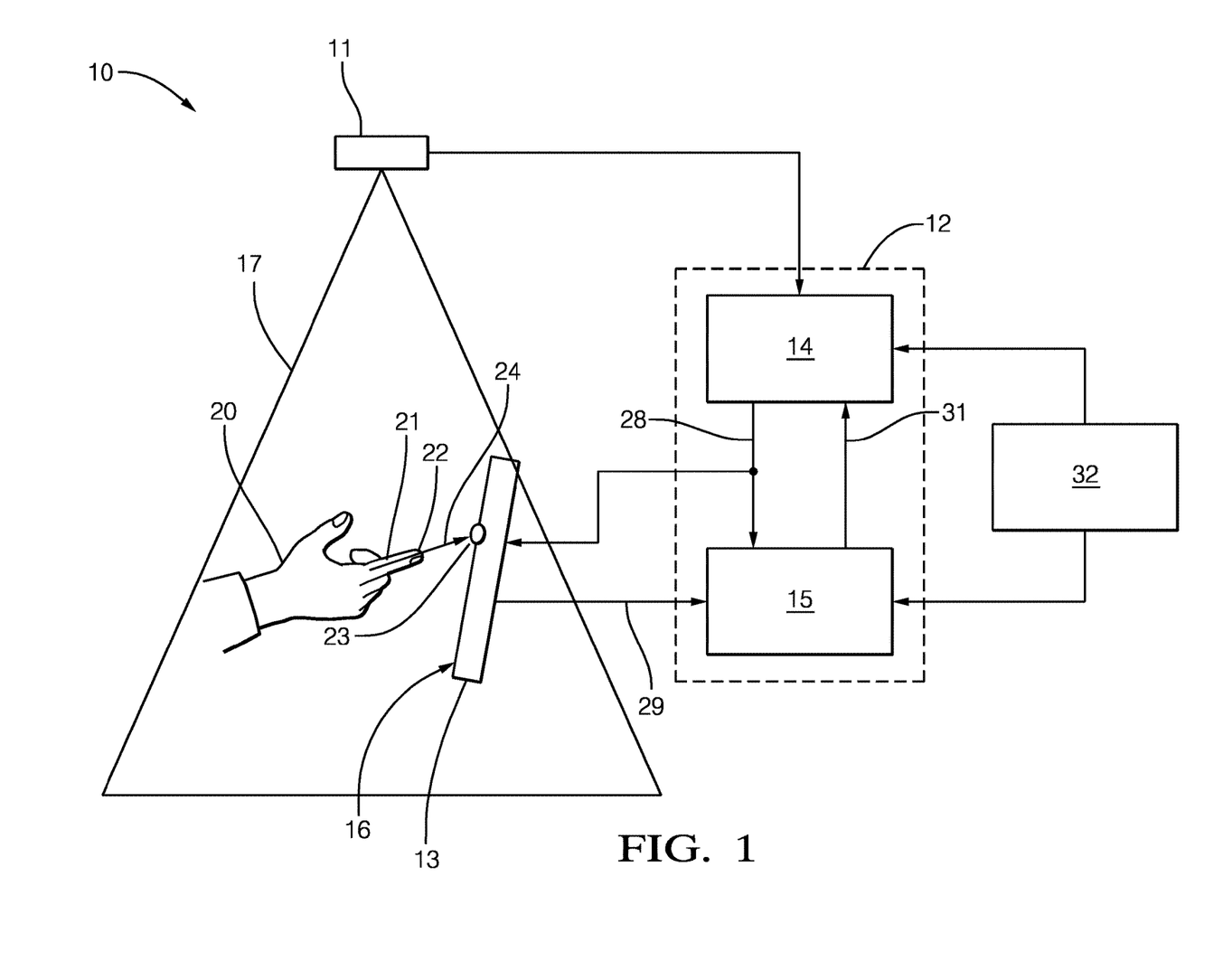
FIG. 1 is a schematic diagram of a system for predicting a touch position of a pointer on a touch-enabled unit.

FIG. 1 illustrates an example of a system 10 for predicting a touch position of a pointer on a touch-enabled unit according to the first aspect. In the following, the system 10 and the function of the system 10 as an example of a method for predicting a touch position of a pointer on a touch-enabled unit according to the second aspect are described.

The system 10 includes a 3D imaging unit 11, a processing unit 12 coupled to the 3D imaging unit 11, and a touch-enabled unit 13 coupled to the processing unit 12. Further, the processing unit 12 includes a prediction module 14 and a calibration module 15. The system 10 can be installed in a vehicle.

The touch-enabled unit 13 can include, for example, a touch screen or a touch pad. In this case, the touch-enabled unit 13 includes a display area or screen 16. In addition, the touch-enabled unit 13 can contain a processing unit. Further, the touch-enabled unit 13 can include, for example, a push button or a touch-sensitive sensor, for example a touch-sensitive capacitive sensor integrated into a dashboard of the vehicle.

The 3D imaging unit 11 monitors a given field of view 17 including an interaction zone in front of the touch-enabled unit 13 and, in particular, in front of the display area 16 of the touch-enabled unit 13. The 3D imaging unit 11 captures 3D images of the scene including a 2D image and a depth map.

The 3D imaging unit 11 can be, for example, a time-of-flight camera or a stereo vision camera. A time-of-flight camera resolves distance based on the known speed of light, measuring the time of flight of a light signal between the camera and the subject for each point of the image. A time-of-flight camera may, for example, include an infrared light emitting diode sending out light and a camera sensor receiving the light after the light has been reflected by a subject.

In the example illustrated in FIG. 1, the processing unit 12 includes the prediction module 14 and the calibration module 15, which can be separate units, but can also be integrated into the same unit, for example a microprocessor. The processing unit 12 may also include one or more additional units, for example a graphical content generator.

The processing unit 12 receives the 2D image and the depth map from the 3D imaging unit 11. With the data provided by the 3D imaging unit 11 it is possible to localize a human hand 20 or any other pointer in 3D space, including the hand centroid, the position and orientation of the fingers, as well as the 3D trajectory of such positions, for example the history of previous positions. In addition, the processing unit 12 can derive a 3D velocity vector for characteristic points on the hand 20. This information can be used, for example, to compute the position of the hand 20 relative to other components of the vehicle interior and to predict the hand position ahead of time based on a given motion model, e.g., constant velocity linear motion.

Given the 3D position and 3D trajectory of the hand 20 with one or more fingers exposed, for example an index finger 21 as illustrated in FIG. 1, it is possible to predict where a finger-tip 22 of the index finger 21 will be in a short amount of time. This information can be used to not only coarsely predict that the hand 20 will be close to the display area 16 of the output unit 13, but also where it will most likely hit it, e.g., the touch screen coordinates of an intersection point 23. The direction of the index finger 21 provides additional information about a pointing direction 24 and the potential intersection point 23 of the pointing direction 24 with the display area 16.

The processing unit 12 receives the 2D image and depth map from the 3D imaging unit 11 and processes the data. The prediction module 14 outputs a predicted touch position 28, i.e., a 2D coordinate on a defined planar region, e.g., the display area 16 of the touch-enabled unit 13, corresponding to the predicted touch position 28, i.e., the intersection point 23, based on the pointing direction 24 of the index finger 20. Further, the prediction module 14 may output the current position of the finger-tip 22, the distance of the finger-tip 22 to the display area 16 and the predicted time to touch the display area 16. This data are provided to the touch-enabled unit 13 or a processing unit coupled to the touch-enabled unit 13, for example a graphical content generator.

If no hand is present or the hand 20 is not pointing towards the display area 16, this information is also communicated to the touch-enabled unit 13.

The content shown on the display area 16 of the touch-enabled unit 13, which can be, for example, an infotainment human machine interface (HMI), can be modified based on the predicted touch position 28 and, in particular, based on the distance of the finger-tip 22 to the display area 16 and/or the predicted time to touch the display area 16.

Based on the knowledge where and when the index finger 21 will touch the touch-enabled unit 13 before it is actually touching, a specific action can be triggered to change the screen content. For example, certain control elements, such icons or buttons, can be highlighted or enlarged, or certain content can be shown or hidden.

In addition, the content displayed by the touch-enabled unit 13 can depend on the approaching direction of the hand 20. For example, the content can be different if the hand 20 approaches from the driver's side compared to an approaching direction from the co-driver's side. Further, the modification of the content can be different for upward movement and downward movement of the hand 20.

Figure 2A:
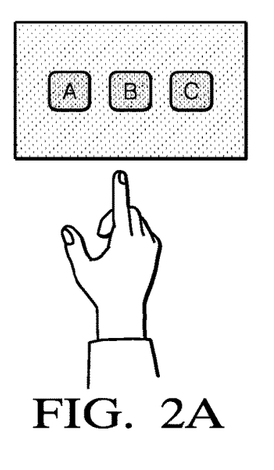
FIGS. 2A, 2B, 3A, 3B, 4A, 4B, and 4C illustrate examples of the modification of the content displayed by the touch-enabled unit.
Figure 2B:
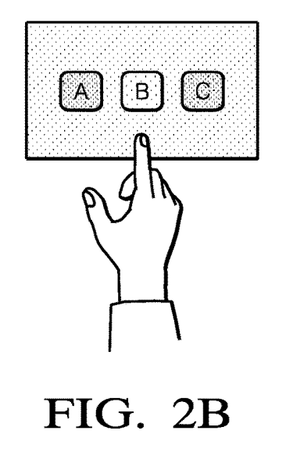
Figure 3A:
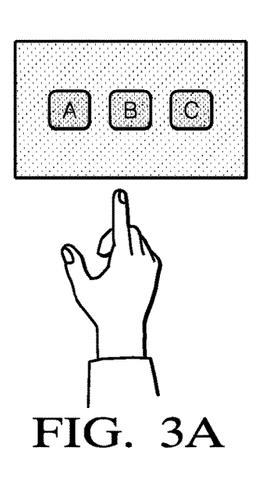
Figure 3B:
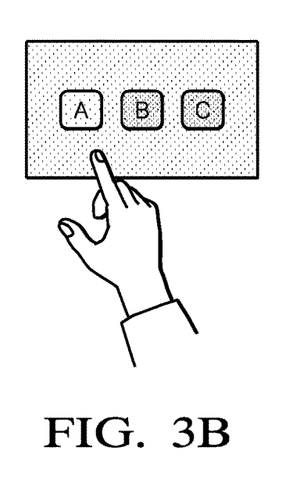
Figure 4A:
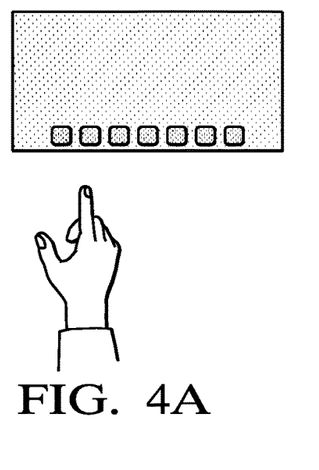
Figure 4B:
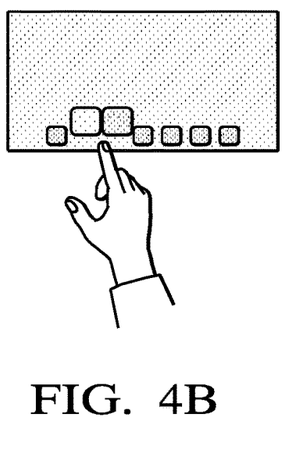
Figure 4C:
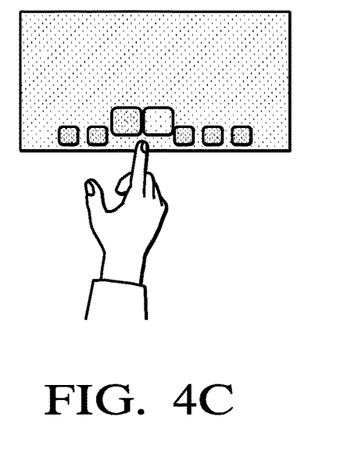

FIGS. 2 to 4 illustrate examples of the content displayed by the touch-enabled unit 13. In FIGS. 2A, 3A and 4A the hand is far from the screen and all icons look the same. In FIG. 2B, the hand approaches the icon "B" and the target icon "B" is highlighted before the hand is actually touching the screen. In FIG. 3B, the hand approaches the icon "A" so that the icon "A" is highlighted before the hand touches the screen. In FIG. 4B, two icons close to the predicted touch position are enlarged when the hand approaches the screen. This allows the user to select the intended icon. If the predicted touch position changes as shown in FIG. 4C, the enlarged icons are adjusted.

If the system 10 is well calibrated, the predicted touch position 28 corresponds to the actual or true touch position 29 as detected by the touch-enabled unit 13 when the index finger 21 actually touches the touch-enabled unit 13. Systematic deviations between the predicted touch position 28 and the actual touch position 29 indicate a calibration error.

Figure 5:
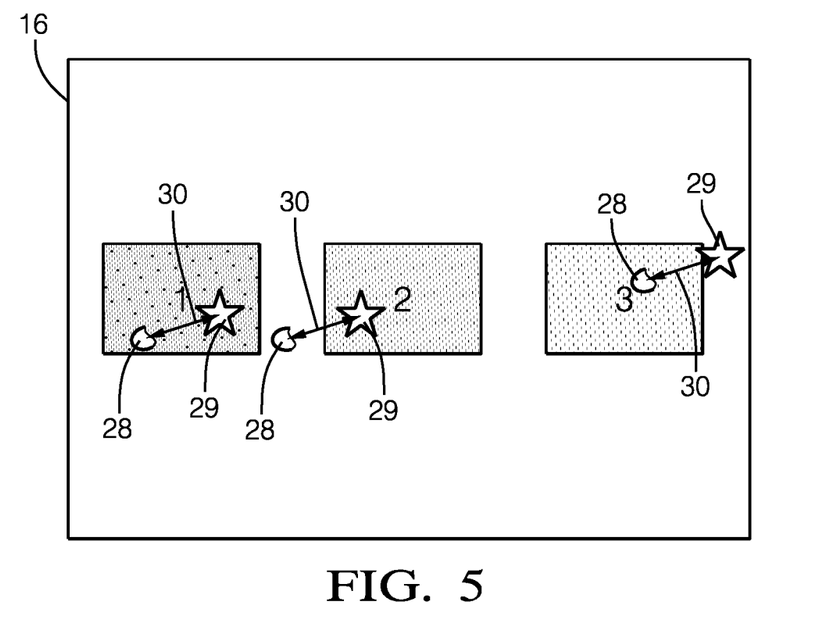
FIG. 5 illustrates an example of a systematic error between the predicted touch position and the actual touch position.

FIG. 5 illustrates an example of a systematic error between the predicted touch position 28 and the actual touch position 29 and possible implications for the user. FIG. 5 shows the display area 16 of the touch-enabled unit 13 with three buttons. In this example the predicted touch position 28, which is indicated by a circle, deviates systematically from the actual or true touch position 29, which is indicated by a star. For button 1 the error 30 indicated by an arrow has no negative implication because both the predicted touch position 28 and the actual touch position 29 are located on the button 1 so that button 1 is selected in both cases. For button 2 the error 30 has a negative impact. The user is touching button 2, but the prediction indicates no button will be pushed. For button 3 the user touches a position nearby, but the prediction indicates the button 3 will be pressed. Compensating the systematic error can help to minimize the risk of such effects.

Referring to FIG. 1, the calibration module 15 is configured to calibrate the prediction module 14 by generating one or more calibration parameters 31 and transferring the calibration parameters 31 to the prediction module 14 such that a deviation or an error between the predicted touch position 28 and the actual or true touch position 29 is minimized. The calibration module 15 generates the calibration parameters 31 by comparing the predicted touch position 28 to the actual touch position 29. The calibration module 15 receives the actual touch position 29 from the touch-enabled unit 13 or a processing unit coupled to the touch-enabled unit 13.

Whenever the touch-enabled unit 13 is touched, the predicted touch positions 28 are stored together with the actual touch positions 29 reported by the touch-enabled unit 13, e.g. on CAN (controller area network) bus or any other communication channel. If sufficient data are available, the calibration model of the touch prediction system is recalibrated by minimizing the error between the predicted touch coordinates and the actual touch coordinates. If the calibration is poor, the predicted touch position might significantly differ from the true position. This might lead, for example, to false selection/highlighting of control elements or other unintended behavior that could cause user frustration.

The calibration can be performed on coordinate level, i.e., very precise information are given about the exact touch positions in a common reference coordinate system, e.g. a coordinate system attached to the vehicle or the 3D imaging unit 11.

Further, a relative calibration can be performed between two coordinate systems, e.g., a coordinate system attached to the 3D imaging unit 11 and a coordinate system attached to the touch-enabled unit 13 and, in particular, the display area 16 or the screen of the touch-enabled unit 11.

For example, the prediction module 14 provides coordinates of the predicted touch position 28 in a coordinate system attached to the 3D imaging unit 11 and the touch-enabled unit 13 provides coordinates of the actual touch position 29 in a coordinate system attached to the touch-enabled unit 13. The calibration parameters 31 generated by the calibration module 15 comprise translating and/or rotating and/or scaling parameters for at least one of the coordinate systems attached to the 3D imaging unit 11 and attached to the touch-enabled unit 13 such that a deviation between the coordinates of the predicted touch position 28 in the coordinate system attached to the 3D imaging unit 11 and the coordinates of the actual touch position 29 in the coordinate system attached to the touch-enabled unit 13 is minimized.

Further, a list of pairs of corresponding 3D points can be stored in a memory, wherein a respective pair consists of one predicted touch position 28 that is obtained from the prediction module 14 and provided in a coordinate system attached to the 3D imaging unit 11 and one actual touch position 29 obtained from the touch-enabled unit 13 and provided in a coordinate system attached to the touch-enabled unit 13.

The calibration module 15 may only use those pairs for the generation of the calibration parameters 31 that contain a predicted touch position 28 that was predicted when the distance of the finger-tip 22 of the index finger 21 from the touch-enabled unit 13 was in a predetermined distance range, for example the predicted touch positions 28 of the pairs were predicted when the finger-tip 22 was in a range from 10 cm to 15 cm away from the touch-enabled unit 13.

Further, the calibration module 15 may only use those pairs for the generation of the calibration parameters 31 that contain a predicted touch position 28 that was predicted during a predetermined time interval before the finger-tip 22 of the index finger 21 touched the touch-enabled unit 13.

Moreover, the calibration module 15 may weight each pair with a respective uncertainty factor before using the pairs for generating the calibration parameters 31. The uncertainty factor depends on the distance of the finger-tip 22 of the index finger 21 from the touch-enabled unit 13 when the prediction module 14 generated the predicted touch position 28 of the respective pair.

The error between the predicted touch positions 28 and the actual touch positions 29 may be minimized by changing the relative position and orientation between a coordinate reference frame on the touch-enabled unit 13, in particular the display area 16 or screen of the touch-enabled unit 13, and a coordinate reference frame on the 3D imaging unit 11.

A coordinate reference frame on the touch-enabled unit 13 can be defined, for example, with the origin at the upper left corner of the screen of the touch-enabled unit 13 or any other reference point, and the X and Y axis of the coordinate reference frame corresponding to the horizontal and vertical axis of the screen, and the Z axis of the coordinate reference frame resulting from the cross product of the two orthogonal axis, i.e., perpendicular to the screen surface. All points inside screen plane have the Z coordinate 0. Thus, a touch point in the reference frame can be described by its 2D touch coordinate.

The corresponding sets of 3D points are related, for example, by a homography or a Helmert 7-parameter coordinate transformation, e.g. translation, rotation, and scale.

Alternatively, non-linear regression methods can be used that take to estimate, for example, the touch point based on a trajectory of the 3D position of the finger-tip 22 of the index finger 21 and pointing vectors together with a non-linear function relating these inputs to the target output function.

Alternatively, machine learning methods can be used to learn the target function from training samples, where the training samples are derived from pairs of input data computed by the processing unit 12 and the output data of the touch-enabled unit 11.

The calibration parameters 31 to be updated by this method include, for example, a constant depth offset for the time of flight sensor, the camera extrinsics, e.g. rotation and translation of the time of flight camera with respect to the vehicle coordinate system, or a translation, rotation, and scaling of the target surface of the touch-enabled unit 11.

The calibration parameters 31 can be generated in a fully automated fashion so that the user does not realize that the system 10 is running a calibrating procedure.

Further, the generation of the calibration parameters 31 can be performed with the help of the user. The calibration module 15 can, for example, request the user to touch predetermined positions on the touch-enabled unit 13 with the index finger 21 in a predetermined order. The prediction module 14 then predicts where the index finger 21 that approaches the touch-enabled unit 13 to touch the predetermined positions will touch the touch-enabled unit 13. Further, the calibration module 15 generates the calibration parameters 31 by comparing the predicted touch positions 28 to the predetermined positions on the touch-enabled unit 13.

The requests generated by the calibration module 15 can, for example, displayed on the screen of the touch-enabled unit 13 so that the user can read the requests and touch the touch-enabled unit 13 in the predetermined way.

The guided calibration procedure is useful in situations where the information about the actual touch position is not available, for example in case no CAN messages with touch screen coordinates are available.

Figure 6:
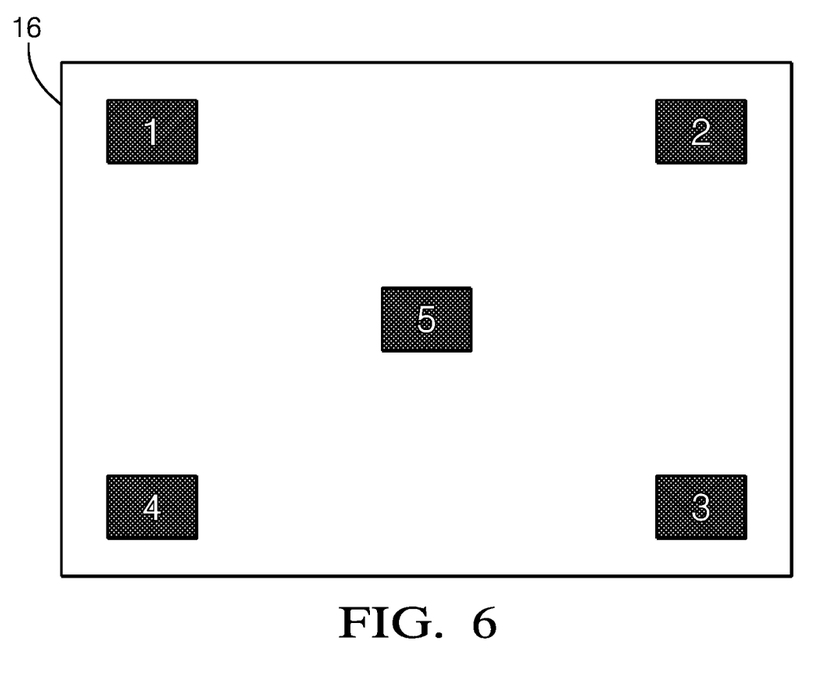
FIG. 6 illustrates an example of a guided calibration procedure.

FIG. 6 shows an example of a guided calibration procedure. The user is asked here to press the buttons 1 to 5 sequentially. The positions, the pattern and the sequence of buttons can also vary.

Referring to FIG. 1, the system 10 further comprises a user identification module 32 that is configured to identify a user using the system 10. The user can be identified, for example, by inputting a certain code or in any other way known by a person skilled in the art. The user identification unit 32 can inform the prediction module 14 and/or the calibration module 15 that a certain user uses the system 10. The calibration module 15 then generates the calibration parameters 31 for the respective user and stores the calibration parameters 31 in a memory. When at a later point in time the same user uses the system 10 again and is identified by the user identification unit 32, the calibration parameters 31 generated for the respective user can be loaded into the prediction module 14.

This calibration method allows the system 10 to adapt to user specific behavior. For example, it can learn how a certain user is aiming at buttons in a certain way. If combined with user identification the calibration parameters 31 can be maintained in user profiles. In that case the proper calibration parameters 31 can be provided for each user. Default calibration parameters 31, e.g. an average over all user profiles or factory defaults, can be provided in case of a new or non-identified user.

Figure 7:
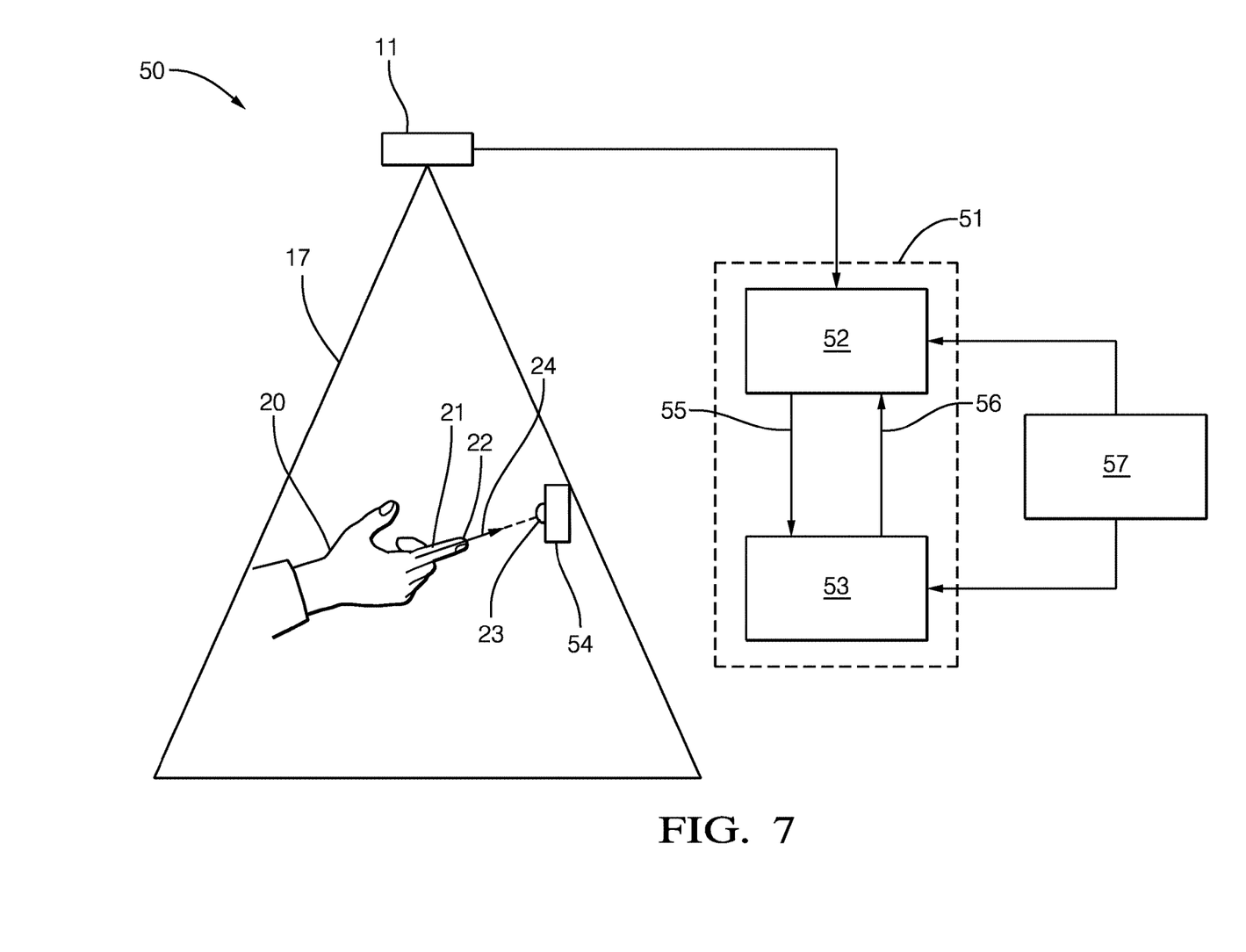
FIG. 7 is a schematic diagram of a system for determining a pointing direction of a pointer in 3D space.

FIG. 7 illustrates an example of a system 50 for determining a pointing direction of a pointer in 3D space according to the third aspect. In the following, the system 50 and the function of the system 50 as an example of a method for determining a pointing direction of a pointer in 3D space according to the fourth aspect are described.

The system 50 includes a 3D imaging unit 11 and a processing unit 51 coupled to the 3D imaging unit 11. Further, the processing unit 51 includes a determination module 52 and a calibration module 53. The system 10 can be installed in a vehicle.

The determination module 52 and the calibration module 53 can be separate units, but can also be integrated into the same unit, for example a microprocessor. The processing unit 51 may also include one or more additional units.

The 3D imaging unit 11 monitors a given field of view 17 in the same fashion as described above in connection with FIG. 1. The 3D imaging unit 11 captures 3D images of the scene including a 2D image and a depth map. The 3D imaging unit 11 can be, for example, a time-of-flight camera or a stereo vision camera.

The system 50 illustrated in FIG. 7 is similar to the system 10 illustrated in FIG. 1, however the system 50 does not predict a touch position of a pointer on a touch-enabled unit, but determines or predicts a pointing direction of a pointer in 3D space. The system 50 does not necessarily include a touch-enabled unit.

The system 50 can be employed in use cases where a user points with the pointer to an object inside or outside the vehicle, i.e., the user points with the pointer in a certain direction, for example, in order to select the object. The object size might differ.

Examples of objects that can be selected by the user by pointing at them are a head up display, non-touch enabled control elements inside the vehicle, e.g. on the dashboard, air conditioning vents, speakers, glove box, windows, mirrors, roof controls, ceiling, interior lights or point of interest in a map, e.g. buildings, sights or gas stations. Objects outside the vehicle that can be selected by the user by pointing at them are, for example, a parking space, a road or a lane.

Similar to the processing unit 12 of the system 10 illustrated in FIG. 1, the processing unit 51 of the system 50 receives the 2D image and the depth map from the 3D imaging unit 11. With the data provided by the 3D imaging unit 11 it is possible to localize a human hand 20 or any other pointer in 3D space, including the hand centroid, the position and orientation of the fingers, as well as the 3D trajectory of such positions, for example the history of previous positions. In addition, the processing unit 51 can derive a 3D velocity vector for characteristic points on the hand 20.

Given the 3D position and 3D trajectory of the hand 20 with one or more fingers exposed, for example the index finger 21 as illustrated in FIG. 7, it is possible to determine or predict the pointing direction 24 of the index finger 21 and an intersection point 23 of the pointing direction 24 with an object 54. Thus, the object 54 at which the index finger 21 points can be identified.

In the system 50, the determination module 52 determines or estimates or predicts a pointing direction 55 of the index finger 21 or any other pointer used by the user when the user has the intention to point to an object 54. Ideally, the determined pointing direction 55 should be equal to the actual or true pointing direction 24 as shown in FIG. 7. The determination module 52 feeds the determined pointing direction 55 to the calibration unit 53. The calibration module 53 generates one or more calibration parameters 56 by comparing the determined pointing direction 55 to the position of the object 54 that is known from a vehicle model and transfers the calibration parameters 56 to the determination module 52 in order to calibrate the determination module 52.

The system 50 further includes an input unit 57 for inputting a command given by the user. The input unit 57 can, for example, include a microphone for recording voice commands given by the user. The commands recorded by the input unit 57 can be transferred to the determination unit 52 and/or the calibration unit 53. The intention of the user when pointing with the index finger 21 in a certain direction can be extracted from the command recorded by the input unit 57. The calibration unit 53 assumes that the user has the intention to point to a certain object 54 if the command input by the user in the input unit 57 is related to this object 54. The calibration module 53 can generate the calibration parameters 56 such that a deviation or an error between the determined pointing direction 55 and the actual or true position of the object 54 is minimized. Thus, after calibration, the deviation between the determined pointing direction 55 and the actual or true pointing direction 24 is minimized and, in particular, the determined pointing direction 55 ideally intersects the object 54.

For example, if the user says "Increase the volume for that speaker" and points in the direction of a particular speaker at the same time, the calibration module 53 assumes that the user has the intention to point to this speaker. The calibration module 53 can then compare the pointing direction 55 determined by the determination module 52 and the actual position of the speaker. The calibration module 53 generates the calibration parameters 56 such that a deviation between the determined pointing direction 55 and the actual position of the particular speaker is minimized.

For objects bigger than the typical finger-tip the position in 3D space can be described, for example, by a single reference point, e.g. centroid, a 3D bounding box, an ellipsoid, other geometrical description, or combinations. The size of an object can be incorporated as uncertainty or weighting of the measurements during the generation of the calibration parameters 56.

The determination module 52 can be configured to determine the pointing direction 55 of the index finger 21 or any other pointer for a plurality of times. If several measurements are conducted when the user points to the same object, this procedure leads to a distribution of the determined pointing directions 55. The determination module 52 can determine the peak or any other average value of the distribution of the determined pointing directions 55. The peak of the distribution corresponds to a specific pointing direction. The calibration module 53 can then generate the calibration parameters 56 by comparing the peak of the distribution of the determined pointing directions 55 to the actual position of the object and generate the calibration parameters 53 accordingly.

In order to not de-calibrate the system 50 with the method described herein, significant statistical evidence has to be collected. If the extrinsic pose of the 3D imaging unit 11 is modified, the method should ensure that the equation system is well-defined, for example, there are multiple measurements to objects at different directions before the calibration parameters 56 are generated and loaded into the determination module 52. Proper outlier detection methods should be in place.

The generation of the calibration parameters 56 can be performed with the help of the user. The calibration module 53 can, for example, request the user to point with the index finger 21 to a predetermined object. The requests generated by the calibration module 53 can, for example, displayed on a screen. The determination module 52 then determines the pointing direction of the index finger 21 when the user points to the predetermined object. Further, the calibration module 15 generates the calibration parameters 31 by comparing the determined pointing direction 55 to the position of the predetermined object.

To calibrate the relative orientation of the coordinate system of the 3D imaging unit 11 to a given object coordinate system, one can also detect and track image features based on, for example, shape, texture, geometrical properties, detection by classification, template matching, in the 3D image, i.e., based on the 2D intensity image and/or the depth map. Such landmarks could be, for example, the corners or outer edges of a display or its rectangular surface, the circular geometry of the steering wheel or a control knob, or the texture of some vents. The landmarks detected in the 3D images can be assigned to objects in a vehicle model. Further, the coordinates of the landmarks in the coordinate system of the 3D imaging unit 11 can be compared to the coordinates of the landmarks in the coordinate system of the vehicle model. If there is a deviation of the coordinates in the coordinate system of the 3D imaging unit 11 from the coordinates of the landmarks in the coordinate system of the vehicle model, one or more calibration parameters, in particular for the rotation and translation of the coordinate system of the 3D imaging unit 11, can be computed in order to minimize the deviation of the coordinates in the two coordinate systems.

It can also be provided to insert intensity frames for calibration. The standard 3D image of the 3D imaging unit 11, in a particular a time-of-flight sensor, contains a 2D intensity image and a depth map. The 2D intensity image represents the amount of light of the active infrared illumination of the sensor. The ambient light is subtracted during the computation of the 3D images. Accordingly, object surfaces that do not reflect the active infrared light appear black. The more active light is reflected back into the 3D imaging unit 11, the brighter the object appears. Displays or touch screens that emit light are considered 'ambient' light for 3D imaging unit 11. Accordingly, the content of the displays or touch screens is not visible to the 3D imaging unit 11, the displays or touch screens appear just black.

It is thus not possible to detect buttons or other elements on the displays, in particular touch screens, which are based on light emission. However, the 3D imaging unit 11 can be configured in a way that it acts similar to a normal intensity camera that captures the scene intensity. In that mode depth information is not available, but the image can contain different elements, for example, the screen content of the display or touch screen assuming it is in the field of view of the camera.

In such frames appearance based methods as described above can be applied again. Depth information can be derived from the known scale of objects in the scene, e.g. the size of a display, or display content.

Thus, in general terms, it can be provided that the 3D imaging unit 11 captures consecutive images, wherein some of the images contain a 2D intensity image and a depth map and at least one of the images contains only the 2D intensity image, but not a depth map. The at least one image containing only the 2D intensity image can be used to determine the exact position or location of elements displayed on the display, in particular the touch screen.

Further, a display unit can display a defined calibration pattern for a certain amount of time. The calibration pattern might contain certain calibration landmarks or feature points that are good to detect from the 3D imaging unit 11. The coordinates of the calibration landmarks or feature points in the coordinate system of the 3D imaging unit 11 can be derived from the one or more images containing only the 2D intensity image, but no depth map. These coordinates can be compared to the predetermined coordinates of the calibration landmarks or feature points in the coordinate system of the vehicle model. If there is a deviation of the coordinates in the two coordinate systems, one or more calibration parameters can be computed in order to minimize the deviation of the coordinates in the two coordinate systems.

I claim:

1. A system for predicting a touch position of a pointer on a touch-enabled unit, said system comprising:
    a 3D imaging unit;
    a processing unit coupled to the 3D imaging unit;
    a touch-enabled unit coupled to the processing unit, wherein the 3D imaging unit is configured to monitor an interaction zone in front of the touch-enabled unit, and the processing unit comprises a prediction module that is configured to predict where a pointer that approaches the touch-enabled unit and is monitored by the 3D imaging unit will touch the touch-enabled unit; and
    a calibration module that is configured to:
        generate at least one calibration parameter by comparing the predicted touch position to the actual touch position of the pointer detected by the touch-enabled unit, use a plurality of pairs for the generation of the at least one calibration parameter, wherein each of the pairs contains a predicted touch position and a corresponding actual touch position, and transfer the at least one calibration parameter to the prediction module to calibrate the prediction module.

2. The system as claimed in claim 1, wherein the prediction module is configured to provide coordinates of the predicted touch position in a coordinate system associated with the 3D imaging unit and the touch-enabled unit is configured to provide coordinates of the actual touch position in a coordinate system associated with the touch-enabled unit, and wherein the at least one calibration parameter comprises translating and/or rotating and/or scaling parameters for at least one of the coordinate systems such that a deviation between the coordinates of the predicted touch position in the coordinate system associated with the 3D imaging unit and the coordinates of the actual touch position in the coordinate system associated with the touch-enabled unit is minimized.

3. The system as claimed in claim 1, wherein a 3D image of a scene captured by the 3D image unit comprises a 2D intensity image of the scene and a depth map of the scene, and wherein the at least one calibration parameter comprises an offset for the values of the depth map.

4. The system as claimed in claim 1, wherein the calibration module is configured to use only those pairs of the plurality of pairs for the generation of the at least one calibration parameter that contain a predicted touch position that was predicted when the distance of the pointer from the touch-enabled unit was in a predetermined distance range, and/or wherein the calibration module is configured to use only those pairs of the plurality of pairs for the generation of the at least one calibration parameter that contain a predicted touch position that was predicted during a predetermined time interval before the pointer touched the touch-enabled unit.

5. The system as claimed in claim 1, wherein the calibration module is configured to weight each pair with a respective uncertainty factor before using the pairs for the generation of the at least one calibration parameter, wherein the uncertainty factor depends on the distance of the pointer from the touch-enabled unit when the prediction module predicted the touch position of the respective pair.

6. The system as claimed in claim 1, wherein the calibration module is configured to request a user to touch at least one predetermined position on the touch-enabled unit with the pointer, wherein the prediction module is configured to predict where the pointer that approaches the touch-enabled unit to touch the at least one predetermined position will touch the touch-enabled unit, and wherein the calibration module is configured to generate the at least one calibration parameter by comparing the predicted touch position to the at least one predetermined position.

7. The system as claimed in claim 1, comprising a user identification module that is configured to identify a user using the system, wherein the calibration module is configured to generate the at least one calibration parameter for a respective user and to store the at least one calibration parameter in a memory, wherein the at least one calibration parameter is transferred to the prediction module from the memory if the user identification module identifies the respective user using the system.

8. A system for determining a pointing direction of a pointer in 3D space, said system comprising:

a 3D imaging unit, and a processing unit coupled to the 3D imaging unit, wherein the processing unit comprises a determination module that is configured to determine a pointing direction of a pointer of a user that is monitored by the 3D imaging unit when the user has the intention to point to an object, and a calibration module that is configured to generate at least one calibration parameter by comparing the determined pointing direction to the position of the object and to transfer the at least one calibration parameter to the determination module in order to calibrate the determination module, wherein the determination module is configured to determine the pointing direction of the pointer pointing to the same object for a plurality of times and to determine a peak in a distribution of the determined pointing directions, and the calibration module is configured to generate the at least one calibration parameter by comparing the pointing direction corresponding to the peak in the distribution of the determined pointing directions to the position of the object.

9. The system as claimed in claim 8, further comprising an input unit for inputting a command by the user, wherein the calibration module is configured to assume that the user has the intention to point to the object if the command input by the user in the input unit is related to the object.

10. The system as claimed in claim 8, wherein the calibration module is configured to request the user to point with the pointer to a predetermined object, wherein the determination module is configured to determine the pointing direction of the pointer when pointing to the predetermined object and wherein the calibration module is configured to generate the at least one calibration parameter by comparing the determined pointing direction to the position of the predetermined object.

11. The system as claimed in claim 8, wherein the 3D imaging unit is configured to capture consecutive images of a scene, wherein at least a first one of the images comprises a 2D intensity image and a depth map, and at least a second one of the images comprise only a 2D intensity image, but not a depth map, wherein the scene comprises a display showing an element and the determination module is configured to determine the coordinates of the element in a coordinate system associated with attached to the 3D imaging unit and the calibration module is configured to generate at least one further calibration parameter for calibrating the coordinate system associated with attached to the 3D imaging unit by comparing the coordinates of the element in the coordinate system associated with attached to the 3D imaging unit to predetermined coordinates of the element in a fixed coordinate system.

12. A system for determining a pointing direction of a pointer in 3D space, said system comprising:

a 3D imaging unit, and a processing unit coupled to the 3D imaging unit, wherein the processing unit comprises a determination module that is configured to determine a pointing direction of a pointer of a user that is monitored by the 3D imaging unit when the user has the intention to point to an object, and a calibration module that is configured to generate at least one calibration parameter by comparing the determined pointing direction to the position of the object and to transfer the at least one calibration parameter to the determination module in order to calibrate the determination module;

wherein the 3D imaging unit is configured to capture consecutive images of a scene, wherein at least a first one of the images comprises a 2D intensity image and a depth map, and at least a second one of the images comprise only a 2D intensity image, but not a depth map, wherein the scene comprises a display showing an element and the determination module is configured to determine the coordinates of the element in a coordinate system associated with the 3D imaging unit and the calibration module is configured to generate at least one further calibration parameter for calibrating the coordinate system associated with the 3D imaging unit by comparing the coordinates of the element in the coordinate system associated with the 3D imaging unit (to predetermined coordinates of the element in a fixed coordinate system.

13. The system as claimed in claim 12, wherein the determination module is configured to determine the pointing direction of the pointer pointing to the same object for a plurality of times and to determine a peak in the distribution of the determined pointing directions, and the calibration module is configured to generate the at least one calibration parameter by comparing the pointing direction corresponding to the peak in the distribution of the determined pointing directions to the position of the object.

14. A system for predicting a touch position of a pointer on a touch-enabled unit, said system comprising:
  a 3D imaging unit, wherein a 3D image of a scene captured by the 3D image unit comprises a 2D intensity image of the scene and a depth map of the scene;
  a processing unit coupled to the 3D imaging unit;
  a touch-enabled unit coupled to the processing unit, wherein the 3D imaging unit is configured to monitor an interaction zone in front of the touch-enabled unit, and the processing unit comprises a prediction module that is configured to predict where a pointer that approaches the touch-enabled unit and is monitored by the 3D imaging unit will touch the touch-enabled unit; and
  a calibration module that is configured to generate at least one calibration parameter by comparing the predicted touch position to the actual touch position of the pointer detected by the touch-enabled unit and to transfer the at least one calibration parameter to the prediction module to calibrate the prediction module, and wherein the at least one calibration parameter comprises an offset for the values of the depth map.

15. The system as claimed in claim 14, wherein the calibration module is configured to use a plurality of pairs for the generation of the at least one calibration parameter, wherein each of the pairs contains a predicted touch position and a corresponding actual touch position.

16. The system as claimed in claim 14, wherein the prediction module is configured to provide coordinates of the predicted touch position in a coordinate system of the 3D imaging unit and the touch-enabled unit is configured to provide coordinates of the actual touch position in a coordinate system of the touch-enabled unit, and wherein the at least one calibration parameter comprises translating and/or rotating and/or scaling parameters for at least one of the coordinate systems attached to the 3D imaging unit and attached to the touch-enabled unit such that a deviation between the coordinates of the predicted touch position in the coordinate system of the 3D imaging unit and the coordinates of the actual touch position in the coordinate system of the touch-enabled unit is minimized.

17. A system for predicting a touch position of a pointer on a touch-enabled unit, said system comprising:
  a 3D imaging unit;
  a processing unit coupled to the 3D imaging unit;
  a touch-enabled unit coupled to the processing unit, wherein the 3D imaging unit is configured to monitor an interaction zone in front of the touch-enabled unit, and the processing unit comprises a prediction module that is configured to predict where a pointer that approaches the touch-enabled unit and is monitored by the 3D imaging unit will touch the touch-enabled unit; and
  a calibration module that is configured to generate at least one calibration parameter by comparing the predicted touch position to the actual touch position of the pointer detected by the touch-enabled unit and to transfer the at least one calibration parameter to the prediction module to calibrate the prediction module;
  wherein the prediction module is configured to provide coordinates of the predicted touch position in a coordinate system of the 3D imaging unit and the touch-enabled unit is configured to provide coordinates of the actual touch position in a coordinate system of the touch-enabled unit, and wherein the at least one calibration parameter comprises translating and/or rotating and/or scaling parameters for at least one of the coordinate systems such that a deviation between the coordinates of the predicted touch position in the coordinate system of the 3D imaging unit and the coordinates of the actual touch position in the coordinate system of the touch-enabled unit is minimized.

18. The system as claimed in claim 17, wherein a 3D image of a scene captured by the 3D image unit comprises a 2D intensity image of the scene and a depth map of the scene, and wherein the at least one calibration parameter comprises an offset for the values of the depth map.

19. The system as claimed in claim 17, wherein the calibration module is configured to use a plurality of pairs for the generation of the at least one calibration parameter, wherein each of the pairs contains a predicted touch position and a corresponding actual touch position.

20. The system as claimed in claim 19, wherein the calibration module is configured to use only those pairs of the plurality of pairs for the generation of the at least one calibration parameter that contain a predicted touch position that was predicted according to at least one control parameter, wherein the at least one control parameter comprises the distance of the pointer from the touch-enabled unit being within a predetermined distance range or the predicted touch position being predicted during a predetermined time interval before the pointer touched the touch-enabled unit.

* * * * *